United States Patent [19]
Sommargren

[11] Patent Number: 5,933,236
[45] Date of Patent: *Aug. 3, 1999

[54] PHASE SHIFTING INTERFEROMETER

[75] Inventor: Gary E. Sommargren, Santa Cruz, Calif.

[73] Assignee: The Regents of the University of California, Oakland, Calif.

[*] Notice: This patent is subject to a terminal disclaimer.

[21] Appl. No.: 08/862,758

[22] Filed: May 23, 1997

Related U.S. Application Data

[63] Continuation of application No. PCT/US95/15274, Nov. 21, 1995, which is a continuation-in-part of application No. 08/345,878, Nov. 28, 1994, Pat. No. 5,548,403.

[51] Int. Cl.⁶ ..................................................... G01B 9/02
[52] U.S. Cl. ........................... 356/354; 356/345; 356/351; 356/359; 356/360
[58] Field of Search .................................... 356/354, 359, 356/360, 345, 351

[56] References Cited

U.S. PATENT DOCUMENTS 4,353,650  10/1982  Sommargren .
4,872,755  10/1989  Kuchel .
5,076,695  12/1991  Ichibara .

*Primary Examiner*—Robert H. Kim
*Assistant Examiner*—Amanda Merlino
*Attorney, Agent, or Firm*—John P. Wooldridge

[57]  ABSTRACT

An interferometer which has the capability of measuring optical elements and systems with an accuracy of $\lambda/1000$ where $\lambda$ is the wavelength of visible light. Whereas current interferometers employ a reference surface, which inherently limits the accuracy of the measurement to about $\lambda/50$, this interferometer uses an essentially perfect spherical reference wavefront generated by the fundamental process of diffraction. Whereas current interferometers illuminate the optic to be tested with an aberrated wavefront which also limits the accuracy of the measurement, this interferometer uses an essentially perfect spherical measurement wavefront generated by the fundamental process of diffraction. This interferometer is adjustable to give unity fringe visibility, which maximizes the signal-to-noise, and has the means to introduce a controlled prescribed relative phase shift between the reference wavefront and the wavefront from the optics under test, which permits analysis of the interference fringe pattern using standard phase extraction algorithms.

14 Claims, 6 Drawing Sheets

PHASE SHIFTING INTERFEROMETER

CROSS REFERENCE TO RELATED APPLICATION

This application is a Continuation of co-pending International Appln. No PCT/US95/15274, filed on Nov. 21, 1995, which is a Continuation-In-Part of U.S. patent application Ser. No. 08/345,878, filed on Nov. 28, 1994, now U.S. Pat. No. 5,548,403. These prior filings are incorporated by reference herein.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to interferometry, and more specifically, it relates to high accuracy diffraction interferometry.

2. Description of Related Art

Interferometry is the preferred method to measure the performance of optical elements and systems. In this method the wavefront of light reflected from or transmitted by the optic to be tested is interfered with the wavefront from a reference surface, to produce an interference fringe pattern. These interference fringes are then analyzed to ascertain the performance of the optic. For high performance imaging systems, such as those found in lithographic steppers used to make integrated circuits, this interferometric measurement must be made to ever increasing accuracy. The accuracy, however, is limited by how well the reference surface is characterized. Reference surfaces are typically no better than $\lambda/50$, where $\lambda$ is the wavelength of visible light, and thus are the limiting factor in fabricating higher performance optical systems. Therefore the fabrication of high accuracy optical systems, such as those needed for extreme ultraviolet projection lithography which require an accuracy of $\lambda/1000$, are impossible to qualify with confidence using existing interferometry.

SUMMARY OF THE INVENTION

It is an object of the present invention to provide a phase shifting diffraction interferometer having $\lambda/1000$ accuracy.

An interferometer is disclosed which has the capability of measuring optical elements and systems with an accuracy of $\lambda/1000$ where $\lambda$ is the wavelength of visible light. Whereas current interferometers employ a reference surface, which inherently limits the accuracy of the measurement to about $\lambda/50$, this interferometer uses an essentially perfect spherical reference wavefront generated by the fundamental process of diffraction. This interferometer is adjustable to give unity fringe visibility, which maximizes the signal-to-noise, and has the means to introduce a controlled prescribed relative phase shift between the reference wavefront and the wavefront from the optics under test, which permits analysis of the interference fringe pattern using standard phase extraction algorithms.

The interferometer described in this disclosure has the ability to achieve this extremely high accuracy by eliminating the reference surface and substituting an essentially perfect spherical reference wavefront generated by the fundamental process of diffraction. Whereas current interferometers illuminate the optic to be tested with an aberrated wavefront which also limits the accuracy of the measurement, this interferometer uses an essentially perfect spherical measurement wavefront generated by the fundamental process of diffraction. The invention maximizes the signal-to-noise and permits analysis of the interference fringe pattern using standard phase extraction algorithms.

DETAILED DESCRIPTION OF THE INVENTION

Figure 1:
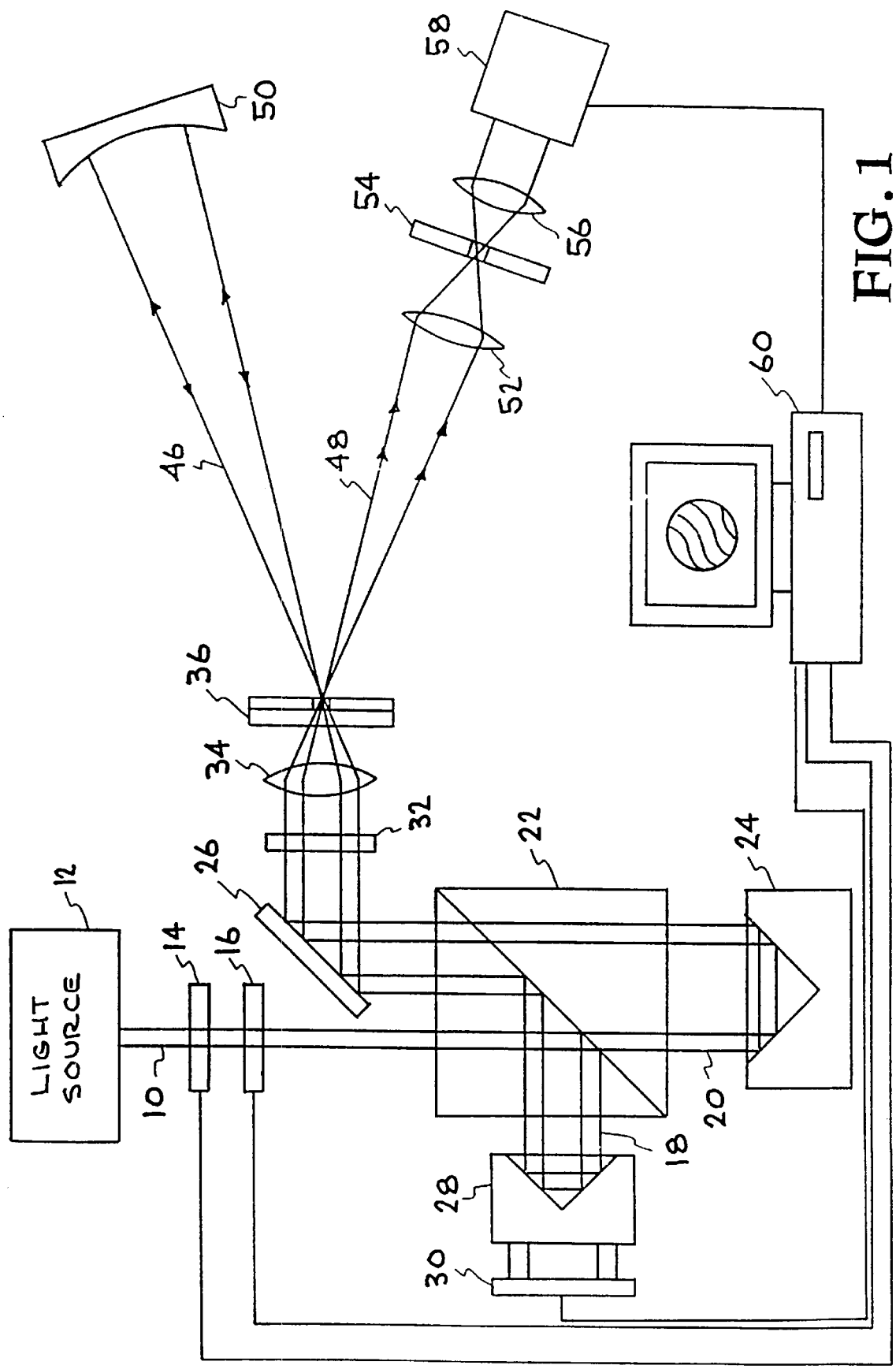
FIG. 1 shows an embodiment of the phase shifting diffraction interferometer.

The interferometer system is shown FIG. 1 in an embodiment that most easily illustrates the essence of the idea, but is not necessarily the preferred embodiment or the only embodiment. It consists of four main parts: the beam conditioning optics; the interferometer; the detection system; and the computer system.

The major components of the beam conditioning optics are the light source, intensity and contrast controls, and the phase shifting module. Referring to FIG. 1, a linearly polarized collimated beam 10 from a light source 12 (e.g., a laser) passes through a variable neutral density filter 14 which is used to control the light level to the interferometer. The beam 10 then passes through a half-wave retardation plate 16 which produces two orthogonally polarized beams, beam 18 having vertical (out of plane) polarization and beam 20 having horizontal (in plane) polarization, both beams within beam 10. The angular orientation of the half-wave retardation plate 16 is used to adjust the relative intensity between the vertical and horizontal components of polarization. Beams 18 and 20 having these two polarization components are then split by a polarization beamsplitter 22 so that the horizontal polarization (beam 20) is transmitted while the vertical polarization (beam 18) is reflected. The transmitted beam 20 is then reflected by a fixed retroreflector 24 back through the polarization beamsplitter 22 to a turning mirror 26. The reflected beam 18 is reflected by a retroreflector 28, mounted on a piezoelectric translator (PZT) 30, back through the polarization beamsplitter 22 to the same turning mirror 26 so that is it parallel to the other beam but laterally displaced from it. Applying a voltage to the PZT 30 translates the retroreflector 28 thus shifting the relative phase between the two orthogonally polarized beams. The two beams pass through a polarizer 32 (axis at 45°) to give them the same polarization and are brought to focus, with a microscope objective 34, on the interferometer plate 36.

Figure 2A:
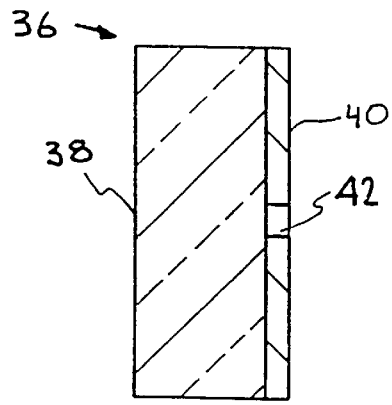
FIG. 2A shows an embodiment of the interferometer plate shown in FIG. 1.
Figure 2B:
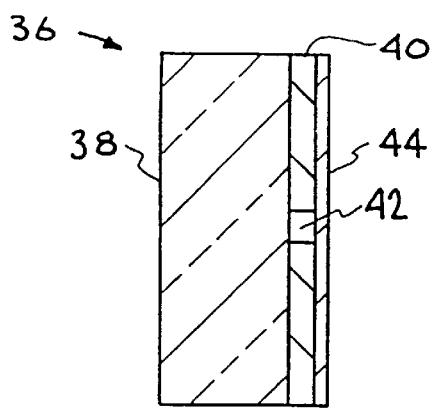
FIG. 2B shows an embodiment of the interferometer plate shown in FIG. 1.

Referring to FIG. 2A, the interferometer plate 36 comprises a glass substrate 38 coated with a highly reflecting, low transmission, metallic film 40, through which a circular aperture 42 has been etched. The diameter of the aperture 42 is on the order of the wavelength of the source 12. Metallic film 40 may typically comprise aluminum having a thickness of 65 nanometers. In the embodiment shown in FIG. 2B, the interferometer plate 36 comprises a glass substrate 38 coated with a highly reflecting, low transmission, metallic film 40, through which a circular aperture 42 has been etched, and over which a second partially transmitting metallic film 44, without an aperture, has been coated. The diameter of the aperture 42 is on the order of the wavelength of the source 12. Metallic film 40 may typically comprises aluminum having a thickness of 65 nanometers and metallic film 44 may typically comprises aluminum having a thickness of 26 nanometers. In both embodiments of the interferometer plate 36, the metallic film 40 and the second metallic film 44 may comprise materials other than aluminum, for example, chromium, gold, nickel, silicon and silver. The thicknesses of the film would vary depending on the material used. This plate serves to generate the point source measurement beam, using one of the beams focused on the plate, to illuminate the optic under test. It simultaneously serves to generate the point source reference beam, using the other focused beam. Because the measurement beam and the reference beam are generated by diffraction, they both comprise a perfect spherical wavefront over some finite solid angle.

Beams 18 and 20 are focused on the interferometer plate 36 so that they are both incident on the aperture 42 in the metallic film 40. Both beams are diffracted by the aperture 42, producing two spherical wavefronts that diverge as they leave the aperture. Each wavefront is perfectly spherical over a finite angular range (defined by the diameter of the aperture relative to the wavelength) centered about the illumination direction defined by the lateral separation of the beams as they entered the microscope objective. As shown in FIG. 1, measurement beam 46 illuminates the optic 50 under test. This optic typically comprises a concave mirror and is positioned to focus the measurement beam 46 back onto the interferometer plate 36. Due to the finite extent of the optic 50 and aberrations therein, the focused measurement beam 46 is much larger than the aperture 42 in the metallic film 40, so nearly all of the focused measurement beam 46 is reflected by the film 40 in the embodiment of the interferometer plate 36 shown in FIG. 2A. In embodiment of the interferometer plate 36 shown in FIG. 2B, focused measurement beam 46 is reflected by the film 44. It diverges and is coincident with the reference beam 48 which was diffracted by the aperture 42. The measurement beam 46 and the reference beam 48 interfere to produce a fringe pattern that represents a contour map of optical path difference between the wavefront from the optic 50 and a perfect spherical wavefront.

The detection system consists of an imaging system to image the optic under test onto a CCD array camera. The imaging system comprises a lens 52, an aperture 54 for spatially filtering the interfering beams, and a lens 56. The aperture 54 is large enough so that it does not diffract the beam focused through it. A typical size is 250 micrometers. The size of the lenses 52, 56, depends on the size of the optic under test.

The coincident measurement beam 46 and reference beam 48, diverging from the intecferometer plate, are collected by a spatial filter imaging system which images the surface of the optic 50 under test onto a screen (not shown) or onto a charge coupled device (CCD) camera 58. This guarantees that the phase of the interfering wavefronts at each pixel in the CCD camera 58 has a one-to-one correspondence with a unique point on the optic 50. It also minimizes effects of edge diffraction from the optic. Aperture 54, at the intermediate focus of the interfering beams, is used to filter out any light not coming from the immediate area around the aperture in the interferometer plate 36. The CCD camera 58 captures a series of interference patterns and transfers them to the computer system 60.

The computer system consists of a computer having a monitor and software to control the light level and contrast of the interference pattern, software to translate the PZT and thus shift the relative phase between the measurement and reference beams, software to calculate the phase at each pixel using the transferred interference patterns, and software to display the resultant phase map. This software for analyzing the interference pattern read into the computer can presently be supplied by several companies. Zygo Corporation produces "Metro Pro" software. Phase Shift Technology produces "Optic Code Analysis Software". WYKO Corporation produces "WISP" software.

The series of interference patterns that are transferred to the computer are captured as the PZT shifts the relative phase of the interfering beams by $2\pi$ radians. The interference patterns are analyzed to determine the proper settings for the light level and contrast of the interference fringes. This information is used by the computer to adjust the position of the neutral density filter 14 and half-wave retardation plate 16. A second series of interference patterns are then captured and analyzed to determine the phase at each pixel. This is typically displayed as a contour or 3D plot of the phase. This phase map corresponds to the deviation of the surface of the optic from a perfect sphere.

This interferometer is unique in that:

a. The measurement beam is generated by diffraction and is a perfect spherical wave over some finite solid angle. The solid angle is defined by the size of the aperture in the interferometer plate relative to the wavelength of light from the source. Smaller apertures produce larger solid angles.

b. The reference beam is generated by diffraction and is a perfect spherical wave over the same solid angle as the measurement beam.

c. No reference surface is required for this interferometer. Reference surfaces are a major source of error in interferometry and ultimately limit the accuracy that can be achieved.

d. The measurement beam reflected from the optic under test is imaged back onto the aperture of the interferometer plate, giving exact coincidence with the reference beam. This is the ideal condition for achieving the highest degree of accuracy.

e. The relative phase between the measurement and reference beams can be shifted in a controlled way. This permits a series of interference patterns to be analyzed to determine the phase at each pixel position with the highest degree of accuracy.

f. The relative intensities of the measurement and reference beams can be adjusted (with the half-wave retardation plate) to give maximum possible contrast. This produces the greatest signal-to-noise, necessary for achieving the highest degree of accuracy.

Figure 3:
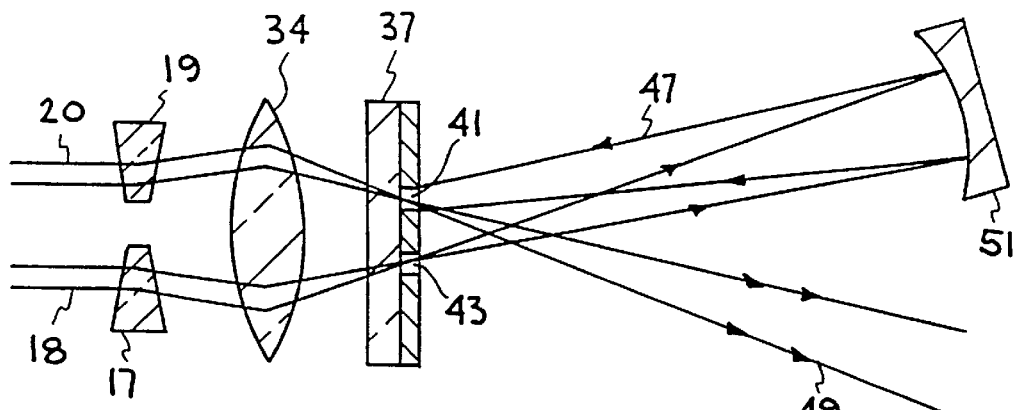
FIG. 3 shows an embodiment of the interferometer plate shown in FIG. 1.

Referring to FIG. 3, interferometer plate 37 may be useful in certain circumstances depending on the optic under test.

Here beams 18 and 20 each pass through a prism 17, 19 respectively, and are focused by lens 34 onto two distinct apertures: aperture 41 and aperture 43 in metallic film 45 of the interferometer plate 37. A tilt is introduced between beam 20 and beam 18 by the prisms. The usable metallic films are the same as described for interferometer plate 36. Apertures 41 and 43 are typically separated from each other by 10 to 500 micrometers. The typical angle between the two focused beams is in the range of 10 to 60 degrees. In the embodiment shown on FIG. 3, beam 18 passes through prism 17 and is focused by lens 34 onto aperture 43 in interferometer plate 37. The resulting diffracted measurement beam 47 is then reflected from test optic 51 to the reflective area surrounding aperture 41 of interferometer plate 37. This beam is reflected along the same path as reference beam 49 to produce an interference pattern therebetween. This embodiment is used to test optical surfaces that are concave with respect to the interferometer plate 37.

Figure 4:
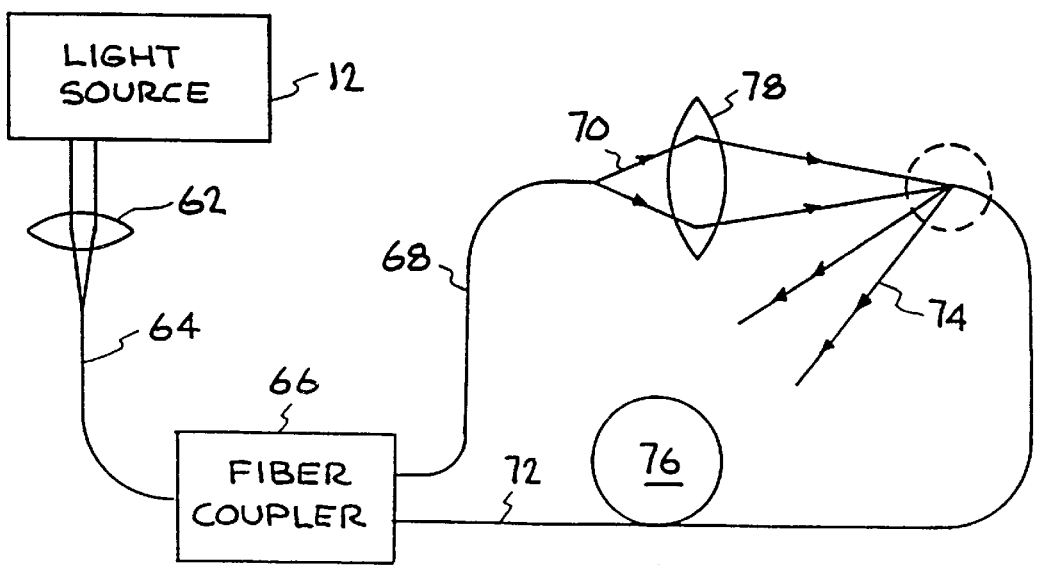
FIG. 4 shows an embodiment of the phase shifting diffraction interferometer.
Figure 5:
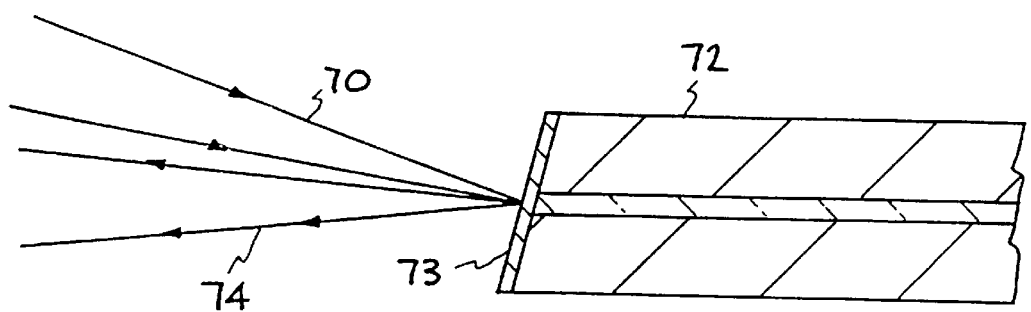
FIG. 5 shows a magnified view of the fiber end shown in FIG. 4.

Another distinctive form of this interferometer system, based on fiber optic technology, operates on the principles described supra. Referring to FIG. 4, light source 12 is focused by lens 62 onto the end of a single mode fiber 64. A variable fiber coupler 66 splits the beam into two fibers: fiber 68 and fiber 72. The ratio of light split into each fiber is chosen for maximum fringe contrast. Fiber 68 is used for the measurement beam 70. Fiber 72, transmitting reference beam 74, is wrapped around a PZT cylinder 76 that expands with an applied voltage. This stresses the fiber 72, changing its refractive index, and introduces a phase shift relative to the measurement beam 70 from fiber 68. The measurement beam 70 leaving the end of the fiber is diffracted, producing a perfect spherical wavefront over some finite solid angle. The solid angle is defined by the size of the fiber core relative to the wavelength of light from the source 12. This spherical measurement beam 70 illuminates the optic 78 under test, which focuses the beam onto the end of the fiber for the reference beam. FIG. 5 shows a magnified view of the exit portion of fiber 72. Measurement beam 70 is focused onto reflective metallic film 73 on the end of fiber 72, and is reflected along the same path as reference beam 74. The rest of the system is as in FIG. 1. This embodiment is used to test positive lenses.

Figure 6:
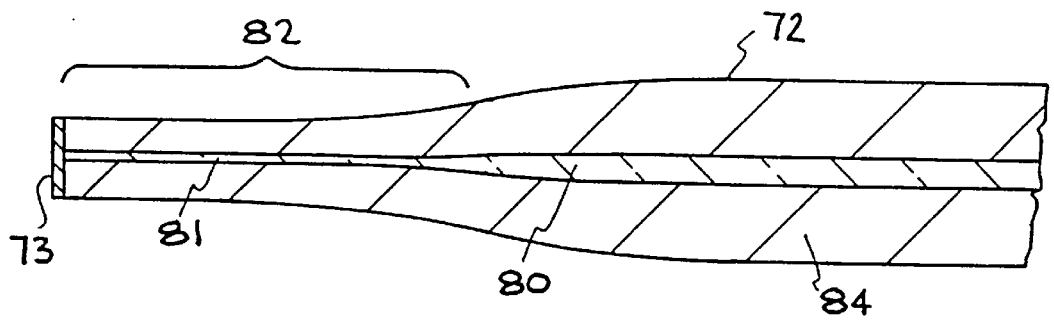
FIG. 6 shows the elongated end of the fiber shown in FIG. 4.

Referring to FIG. 6, it may be necessary to shrink the core diameter of fibers 68 and 72 to match the aperture size for the interferometer. This is accomplished by heating and pulling the fiber. For example, fiber 72, having cladding 84 and core 80 is heated and pulled to produced a stretched portion 82 with a core 81 having a diameter that is smaller than the unstretched core portion 80. Metallic film 73 is coated after heating and stretching and can comprise any of the films described supra. One embodiment of the metallic film comprises aluminum having a thickness of 26 nanometers. Single mode fibers typically have core diameters of about 4 micrometers. The measurement beam is reflected from the end of the fiber while the reference beam is transmitted through the film and diffracted, giving a perfect spherical wavefront over the same finite solid angle as the measurement wavefront. The solid angle is defined by the size of the fiber core relative to the wavelength of light from the source 12. The imaging, computer systems, data acquisition and analysis are the same as described above. This fiber optic approach has all the advantages of the system described above as well as the flexibility to independently move the measurement and reference fibers to any positions to suit the interferometric measurement configuration. If light source 12 comprises a short coherence length, the fiber lengths 68 and 72 must be adjusted so that the optical path lengths from variable fiber coupler 66 to the end of fiber 72 for both the measurement beam 70 and reference beam 74 are equal.

Figure 7:
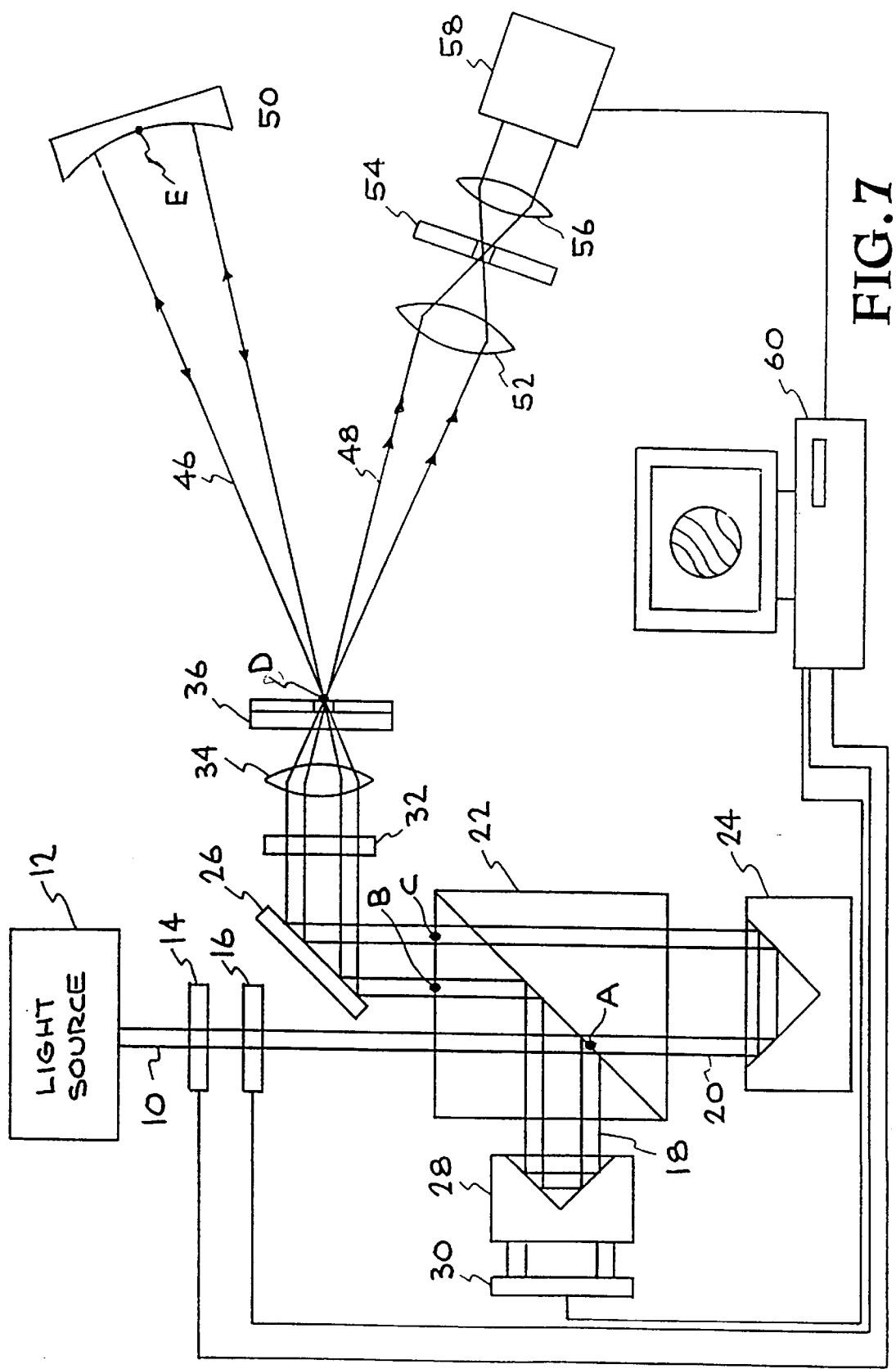
FIG. 7 shows an embodiment of the phase shifting diffraction interferometer utilizing coherence length.

Another embodiment of the invention is shown in FIG. 7. In this embodiment light source 12 has a short coherence length and beams 18 and 20 are reflected back through the polarization beamsplitter 22 so they are coincident and collinear. Retroreflector 24 is positioned such that optical path length ACD is equal to optical path length ABDED. In other word, retroreflector 24 is moved to a position where the round-trip beam path difference between the two retroreflectors is equal to the round-trip path between the interferometer plate and the optic under test. The optical path lengths of the interfering measurement and reference beams are then the same. As in FIG. 1, PZT 30 can be attached to either retroreflector. This condition produces high contrast fringes in the interference pattern and eliminates any extraneous interference due to light from the measurement beam spreading into the reference beam. This configuration also eliminates any extraneous interference due to light from the reference beam spreading into the measurement beam.

Figure 8:
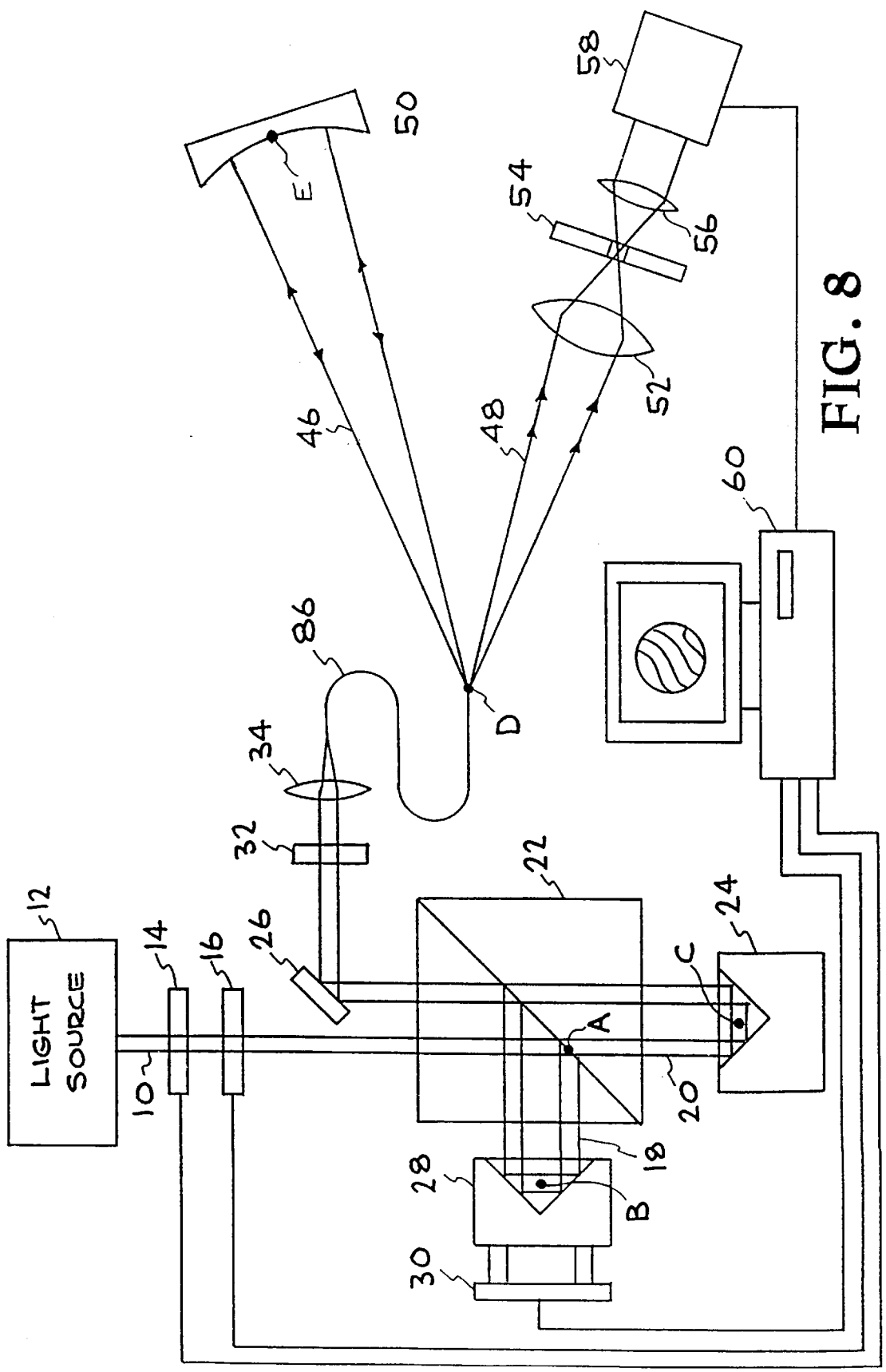
FIG. 8 is an embodiment using a single mode optical fiber.

Another embodiment of the invention is shown in FIG. 8. This embodiment is the same as in FIG. 7, except that interferometer plate 36 is replaced by single mode optical fiber 86. The far end of single mode optical fiber 86 serves the same purpose as interferometer plate 36, and is shown in detail in FIG. 9. This embodiment is most useful when measuring optics such that their conjugates coincide; for example, as when measuring a concave mirror at its center of curvature.

Figure 9:
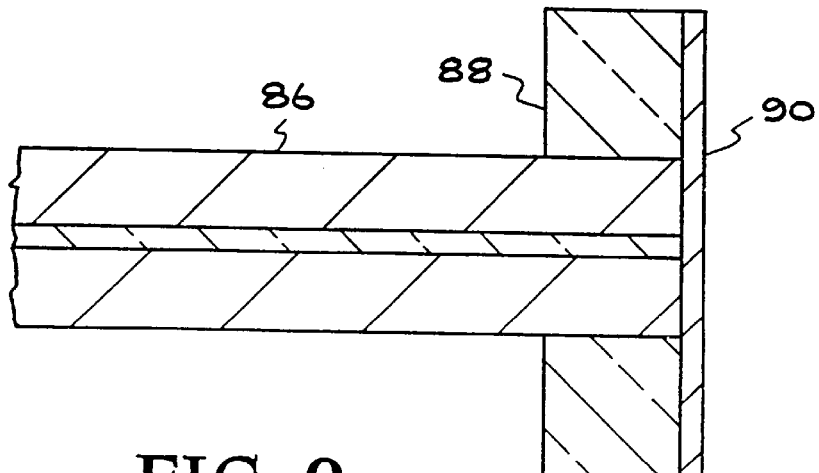
FIG. 9 shows the details at the far end of a single mode fiber.

FIG. 9 shows the details at the far end of single mode optical fiber 86. It is embedded in substrate 88. The surface of the structure is polished flat and smooth and coated with thin reflecting metal layer 90 that both reflects and transmits approximately 40% of the light from the single mode optical fiber 86.

Figure 10:
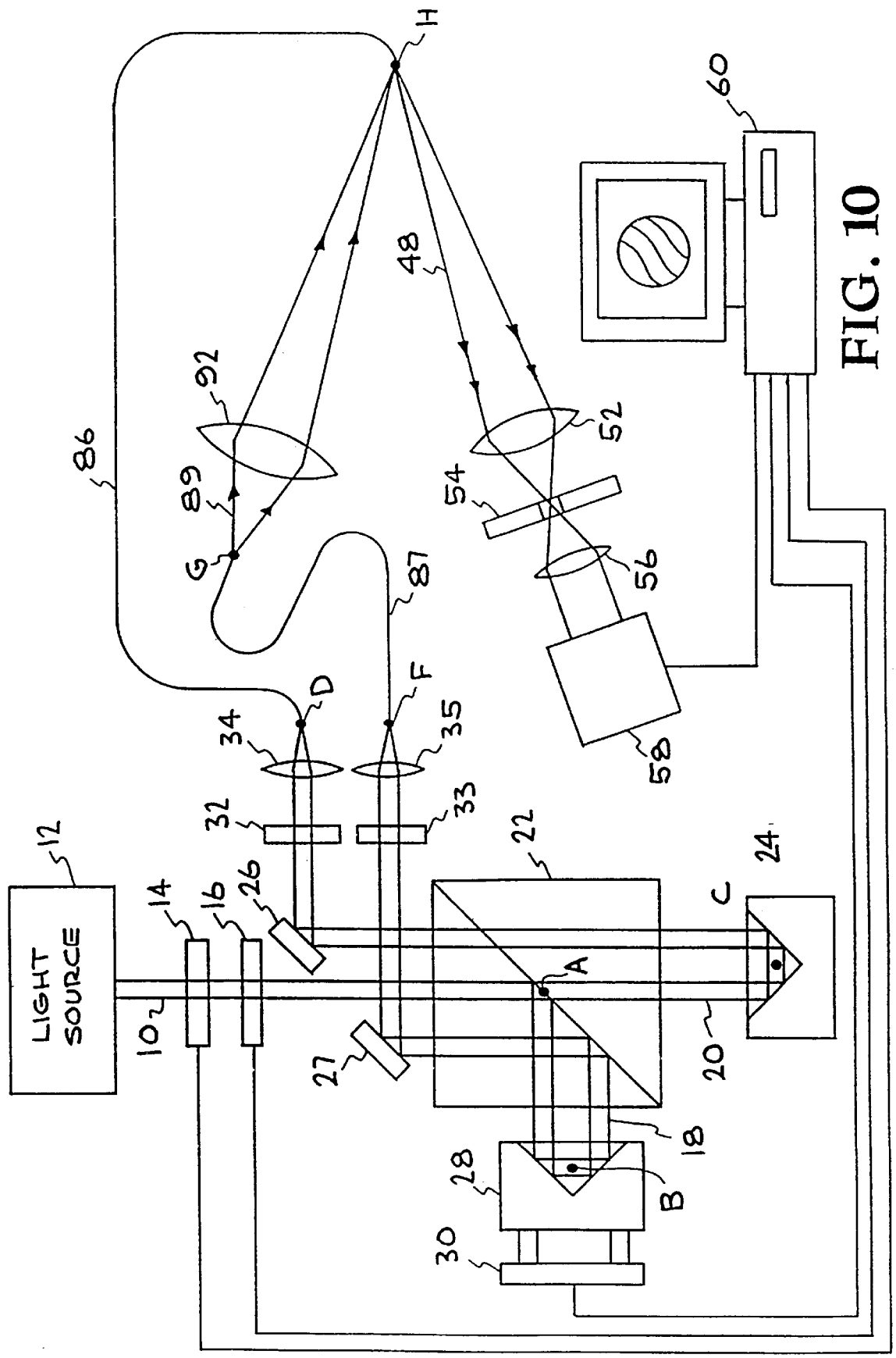
FIG. 10 is another embodiment of the invention.

Another embodiment of the invention is shown in FIG. 10. This embodiment is similar to FIG. 8 except that beams 18 and 20 are reflected back through polarization beamsplitter 22 so they are parallel to and displaced from each other. Reflected beam 18 now is reflected from turning mirror 27, passes through polarizer 33 and is brought to a focus with microscope objective 35, on a second single mode optical fiber 87. The measurement beam 89, leaving the end of single mode optical fiber 87, is diffracted, producing a perfect spherical wavefront over some finite solid angle. After passing through the optic 92 under test, aberrations are imparted to measurement beam 89. Focused measurement beam 89 is reflected by reflecting metal layer 90 on the surface of single mode optical fiber 86. It diverges and is coincident with reference beam 48 that is diffracted, producing a perfect spherical wavefront over some finite solid angle. For interference to take place as described previously, the length of single mode optical fibers 86 and 87 are equal and retroreflector 24 is positioned such that the optical path length ACD is equal to optical path length ABF+GH. Another requirement for interference to take place is that the polarization of reference beam 48 and measurement beam 89 be identical. This is accomplished by determining the polarization state of each beam, and then physically manipulating the fibers until the measurement beam 89 and the reference beam 48 have identical polarization states. This embodiment is most useful when measuring optics such that their conjugates are spatially distinct, for example, as when measuring an imaging system.

Although only those embodiments for the measurement of concave mirrors and positive lenses were described, other embodiments exist for measurement of convex mirrors and negative lenses Changes and modifications in the specifically described embodiments can be carried out without departing from the scope of the invention, which is intended to be limited by the scope of the appended claims.

I claim:

1. A phase shifting diffraction interferometer, comprising:
   means for separating a linearly polarized, collimated and coherent beam of light into two parallel, spatially separated, orthogonally polarized coherent beams of light;
   means for introducing a phase shift between said two parallel, spatially separated, orthogonally polarized coherent beams of light;
   a polarizer to orient said two parallel, spatially separated, orthogonally polarized coherent beams of light into two parallel, spatially separated, identically polarized coherent beams of light;
   means for focusing said two parallel, spatially separated, identically polarized coherent beams of light to a focal point;
   an interferometer plate comprising:
      a glass substrate;
      a highly reflective metallic film adherent to said glass substrate; and
      at least one circular aperture through said glass substrate and said highly reflective metallic film, wherein said circular aperture is placed at said focal point and has a diameter of about the size of the wavelength of said coherent beam of light, wherein said interferometer plate diffracts said two parallel, spatially separated, identically polarized coherent beams of light at said focal point to produce a measurement beam and a reference beam; and
   means for focusing said measurement beam onto said aperture and said highly reflective metallic film, wherein said measurement beam and said reference beam combine to form an interference pattern, wherein said means for separating a linearly polarized, collimated and coherent beam of light into two parallel, spatially separated, orthogonally polarized coherent beams of light comprise:
   a light source for producing a linearly polarized, collimated and coherent beam of light;
   a variable neutral density filter for controlling the intensity of said linearly polarized, collimated and coherent beam of light;
   a half-wave retardation plate for producing, within said linearly polarized, collimated and coherent beam of light, two orthogonally polarized components of light comprising a vertical component and a horizontal component, wherein the angular orientation of said half-wave retardation plate is used to adjust relative intensity between said vertical component and said horizontal component;
   a polarization beamsplitter optically positioned to transmit said horizontal component to produce a first transmitted horizontally polarized component, wherein said polarization beamsplitter is optically positioned to reflect said vertical component to produce a first reflected vertically polarized component;
   a first retroreflector optically positioned to laterally reflect said first transmitted horizontally polarized component back into said polarization beamsplitter for transmission therethrough to produce a horizontally polarized beam; and
   a second retroreflector optically positioned to laterally reflect said first reflected vertically polarized component back into said polarization beamsplitter for reflection therefrom to produce a vertically polarized beam;
   wherein said vertically polarized beam and said horizontally polarized beam together comprise two parallel, spatially separated, orthogonally polarized coherent beams of light,
   wherein said means for introducing a phase shift between said two parallel, spatially separated, orthogonally polarized coherent beams of light comprises a piezoelectric translator (PZT) mounted on a retroreflector selected from a group consisting of said first retroreflector and said second retroreflector, wherein said PZT translates said retroreflector when a voltage is applied to said PZT, thus shifting the relative phase between said two parallel, spatially separated, orthogonally polarized beams of light,
   wherein said interferometer plate further comprises a partially reflective metallic film adherent to said highly reflective metallic film, wherein said partially reflective metallic film covers said highly reflective metallic film and said aperture.

2. The phase shifting diffraction interferometer of claim 1, wherein said means for focusing said measurement beam onto said aperture and said highly reflective metallic film comprises an optic to be tested.

3. The phase shifting diffraction interferometer of claim 2, further comprising an imaging system for imaging said interference pattern, said imaging system comprising a spatial filter comprising a first lens, an aperture and a second lens, wherein said spatial filter is positioned to transmit said interference pattern, wherein said aperture is large enough that it does not diffract said interference pattern.

4. The phase shifting diffraction interferometer of claim 3, wherein said imaging system further comprises a screen for displaying said interference pattern after it is transmitted through said spatial filter.

5. The phase shifting diffraction interferometer of claim 3, wherein said imaging system further comprises a charge coupled display camera and monitor for displaying said interference pattern after it is transmitted through said spatial filter.

6. The phase shifting diffraction interferometer of claim 3, further comprising a computer system having a central processing unit, memory and software to: read said interference pattern from said CCD camera, control the intensity and contrast of said interference pattern, translate said PZT, calculate the phase at each pixel and display a resultant phase map.

7. The phase shifting diffraction interferometer of claim 2, wherein said means for focusing said two parallel, spatially separated, identically polarized coherent beams of light to a focal point comprises a prism in each beam of said two beams, wherein said prisms refract said two beams away from each other, said means for focusing said two parallel, spatially separated, identically polarized coherent beams of light further comprising a lens.

8. A phase shifting diffraction interferometer, comprising:
   means for separating a linearly polarized, collimated and coherent beam of light into two parallel, spatially separated, orthogonally polarized coherent beams of light;
   means for introducing a phase shift between said two parallel, spatially separated, orthogonally polarized coherent beams of light;

a polarizer to orient said two parallel, spatially separated, orthogonally polarized coherent beams of light into two parallel, spatially separated, identically polarized coherent beams of light;

means for focusing said two parallel, spatially separated, identically polarized coherent beams of light to a focal point;

an interferometer plate comprising:
  a glass substrate;
  a highly reflective metallic film adherent to said glass substrate; and
  at least one circular aperture through said glass substrate and said highly reflective metallic film, wherein said circular aperture is placed at said focal point and has a diameter of about the size of the wavelength of said coherent beam of light, wherein said interferometer plate diffracts said two parallel, spatially separated, identically polarized coherent beams of light at said focal point to produce a measurement beam and a reference beam; and means for focusing said measurement beam onto said aperture and said highly reflective metallic film, wherein said measurement beam and said reference beam combine to form an interference pattern, wherein said at least one circular aperture comprises two apertures, wherein said lens focuses said two parallel, spatially separated, identically polarized coherent beams of light onto separate apertures of said two apertures.

9. A phase shifting diffraction interferometer, comprising:
means for producing, within a collimated and spatially coherent beam of light, two orthogonally polarized components of light comprising a vertical component and a horizontal component;

means for introducing a phase shift between said vertical component and said horizontal component, to produce a phase shifted beam;

means for producing a measurement beam and a reference beam from said phase shifted beam;

means for combining said measurement beam and said reference beam to form an interference pattern.

10. The phase shifting diffraction interferometer of claim 9, wherein said means for producing, within a collimated and spatially coherent beam of light, two orthogonally polarized components of light comprising a vertical component and a horizontal component, comprise:
  a light source for producing a linearly polarized, collimated and spatially coherent beam of light; and
  a half-wave retardation plate for producing, within said linearly polarized, collimated and spatially coherent beam of light, two orthogonally polarized components of light comprising a vertical component and a horizontal component, wherein the angular orientation of said half-wave retardation plate is used to adjust relative intensity between said vertical component and said horizontal component.

11. The phase shifting diffraction interferometer of claim 10, wherein said means for introducing a phase shift between said vertical component and said horizontal component comprise:
  a polarization beamsplitter optically positioned for reflecting said vertical component to produce a first reflected vertically polarized component, wherein said polarization beamsplitter is optically positioned for transmitting said horizontal component to produce a first transmitted horizontally polarized component;
  a first retroreflector optically positioned to laterally reflect said first transmitted horizontally polarized component back into said polarization beamsplitter for transmission therethrough to produce a horizontally polarized beam;
  a second retroreflector optically positioned to laterally reflect said first reflected vertically polarized component back into said polarization beamsplitter for reflection therefrom to produce a vertically polarized beam;
  wherein said vertically polarized beam and said horizontally polarized beam are colinear, and
  wherein said means for introducing a phase shift comprise a piezoelectric translator (PZT) mounted on a PZT reflector selected from a group consisting of said first retroreflector and said second retroreflector.

12. The phase shifting diffraction interferometer of claim 11, wherein said means for producing a measurement beam and a reference beam from said phase shifted beam comprise:
  a single mode fiber comprising an input end and an output end, wherein said output end is embedded in a substrate, said output end further comprising a thin reflecting metal layer;
  means for focusing said phase shifted beam into said input end of said single mode fiber;
  wherein said first retroreflector and said second retroreflector are positioned such that the round trip beam path difference between said first retroreflector and said second retroreflector is equal to the round trip beam path between said output end of said single mode fiber and an optic under test.

13. A phase shifting diffraction interferometer, comprising:
  means for separating a linearly polarized, collimated and spatially coherent beam of light into two parallel, spatially separated, orthogonally polarized coherent beams of light comprising a vertically polarized beam and a horizontally polarized beam;
  means for introducing a phase shift between said vertically polarized beam and said horizontally polarized beam;
  a first single mode fiber comprising a first input end and a first output end, wherein said first output end is embedded in a substrate, said first output end further comprising a thin reflecting metal layer;
  a second single mode fiber comprising a second input end and a second output end;
  wherein said first single mode fiber and said second single mode fiber are the same length,
  means for focussing said horizontally polarized beam into said first single mode fiber, wherein a reference beam diverges from said first output end;
  means for focussing said vertically polarized beam into said second single mode fiber, wherein a signal beam diverges from said second output end; and
  means for combining said measurement beam and said reference beam to form an interference pattern.

14. The phase shifting diffraction interferometer of claim 13, wherein said means for introducing a phase shift between said vertically polarized beam and said horizontally polarized beam comprise a piezoelectric translator (PZT) mounted on a PZT reflector selected from a group consisting of said first retroreflector and said second retroreflector, wherein said PZT translates said PZT reflector when a voltage is applied to said PZT, thus shifting the relative phase between said vertically polarized beam and said horizontally polarized beam.

* * * * *